United States Patent [19]
Ueda et al.

[11] 3,945,840
[45] Mar. 23, 1976

[54] NON-COMBUSTIBLE MOLDING MATERIAL

[75] Inventors: Harutoshi Ueda, Osaka; Naoyuki Suzuki, Nara; Masami Nagao, Takatsuki, all of Japan

[73] Assignee: Sekisui Kagaku Kogyo Kabushiki Kaisha, Osaka, Japan

[22] Filed: Oct. 15, 1973

[21] Appl. No.: 406,611

Related U.S. Application Data
[63] Continuation-in-part of Ser. No. 183,077, Sept. 23, 1971, abandoned.

[30] Foreign Application Priority Data

| Sept. 24, 1970 | Japan | 45-84199 |
| Sept. 24, 1970 | Japan | 45-84200 |
| Sept. 25, 1970 | Japan | 45-84468 |
| Oct. 22, 1970 | Japan | 45-93221 |
| Nov. 16, 1970 | Japan | 45-101231 |
| Dec. 28, 1970 | Japan | 46-126941 |
| Dec. 29, 1970 | Japan | 46-124120 |

[52] U.S. Cl. ............... 106/87; 106/99; 106/120; 106/286

[51] Int. Cl.² ... C04B 7/32; C04B 7/34; C04B 21/02

[58] Field of Search ............... 106/120, 99, 87, 286

[56] References Cited
UNITED STATES PATENTS

| 2,698,251 | 12/1954 | Shea et al. | 106/120 |
| 3,001,882 | 9/1961 | Taylor | 106/120 |
| 3,211,675 | 10/1965 | Johnson | 106/87 |
| 3,501,324 | 3/1970 | Kubo | 106/120 |
| 3,591,394 | 7/1971 | Diggelmann et al. | 106/87 |
| 3,661,603 | 5/1972 | Nicol | 106/99 |

*Primary Examiner*—Allan Lieberman
*Attorney, Agent, or Firm*—Wenderoth, Lind & Ponack

[57] ABSTRACT

A non-combustible molding material is produced from (a) a hydraulic inorganic mixture consisting of an inorganic substance composed predominantly of silica and an inorganic substance predominantly of a source of calcium oxide, (b) mineral fibers, and (c) a substance selected from the group consisting bitumen, crystalline aluminum oxide, sulfur, metal sulfide and vanadum oxide. A non-combustible molded article having superior flexural strength and low water absorption can be prepared using said material.

13 Claims, 1 Drawing Figure

U.S. Patent  March 23, 1976  3,945,840
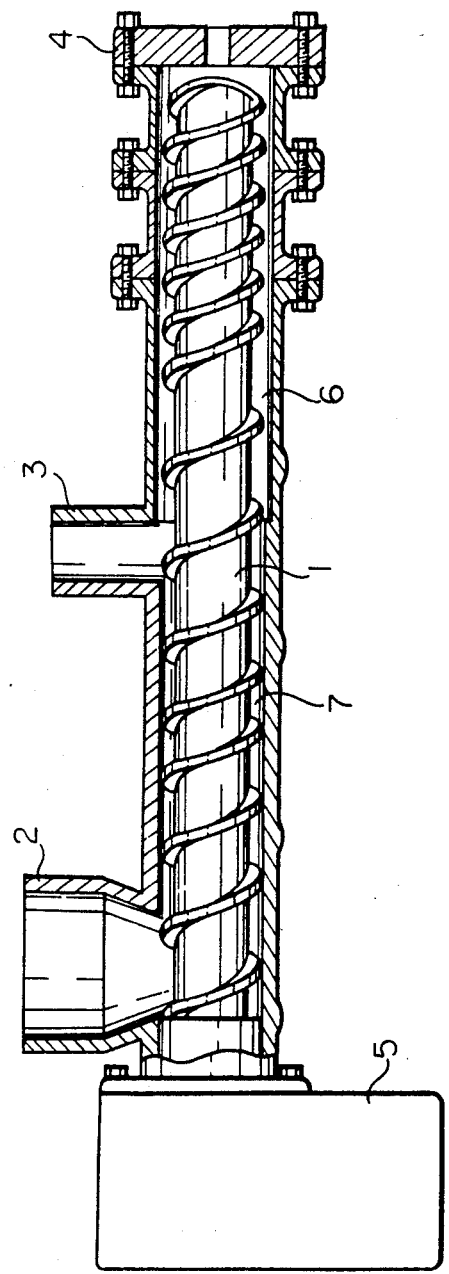

NON-COMBUSTIBLE MOLDING MATERIAL

This application is a continuation-in-part of our co-pending application Ser. No. 183,077, filed Sept. 23, 1971 now abandoned.

This invention relates to a non-combustible molding material. More particularly, the invention relates to a non-combustible molding material comprising a hydraulic inorganic mixture consisting of an inorganic substance composed predominantly of silica and an inorganic substance composed predominantly of a source of calcium oxide, mineral fibers, and an organic substance, and a process for producing said molding material.

In recent years, the development of fire-retarding or non-combustible molding materials has been demanded in order to provide building materials that can prevent the occurrence and spreading of fire. There has been proposed a fire-retardant molding material comprising cement, gypsum and mineral fibers, and an organic fiber which is added for improving the properties of the material. Since the organic fiber has combustibility and is added in great quantities, it is impossible to improve the fire-retarding properties of the molding material, and the material produced does not have good flexural strength.

A primary object of the invention is to provide a non-combustible molding material having high non-combustibility and flexural strength.

Another object of the invention is to provide a process for producing a non-combustible molding material.

Still another object of the invention is to provide a process for producing a non-combustible molded article from the non-combustible molding material.

The advantages and other objects of the invention will become apparent from the following description.

According to the present invention, there is provided a non-combustible molding composition which is capable of hardening after being dehydrated to a moisture content of 5 to 50 percent by weight comprising:

a. 100 parts by weight of a hydraulic inorganic mixture consisting of an inorganic substance composed predominatly of silica and an inorganic substance composed predominantly of a source of calcium oxide;

b. 10 to 200 parts by weight of mineral fibers;

c. a substance selected from the group consisting of:
1. 0.5 to 5 parts by weight of bitumen;
2. 1 to 15 parts by weight of crystalline aluminum oxide;
3. 1 to 10 parts by weight of sulfur;
4. 1 to 10 parts by weight of metal sulfide; and
5. 1 to 10 parts by vanadium oxide.

In the present invention, cement or gypsum which sets in the presence of water is not used as the "hydraulic inorganic substance" because it only gives a product having low flexural strength, thermal stability, and dimensional stability.

The mixture of an inorganic substance composed predominantly of silica and an inorganic substance composed predominantly of a source of calcium oxide as used in the present invention has the property of setting upon adding water and heating.

Examples of the inorganic substance composed predominantly of silica include quartz rock, silica sand, aplite, pottery stone, silicate terra abla, diaspore, diatomaceous earth, fly ash, perlite, obsidian perlite, pumice microballoon, foamed shale pumice, foamed clay and vermiculite. On the other hand, examples of the inorganic substance composed predominantly of calcium oxide are slaked lime, quick lime and calcium carbonate.

In the hydraulic inorganic mixture used in the invention, the molar ratio of the inorganic substance composed predominantly of silica to the inorganic substance composed predominantly of a source of calcium oxide is from 0.5 to 1.2.

The hydraulic inorganic mixture is preferably in the form of powders having a particle size such as to pass a 80-mesh Tyler sieve, preferably a 300-mesh Tyler sieve.

By the term "mineral fiber," as used in the present invention, is meant a fibrous substance which is not hydraulic and has a length of 3 mm to 30 mm, especially 5 mm to 15 mm.

Examples of the mineral fiber that can be used in the present invention are: chrysotile asbestos ($3MgO.SiO_2.2H_2O$), amosite asbestos [$(FeMg)_6Si_8O_{22}(OH)_2$], crocidolite asbestos [$Na_2Fe_6Si_8O_{22}(OH)_2$], amphibole asbestos [$Ca_2Mg_5Si_8O_{22}(OH)_2$], tremolite asbestos [$Ca_2Mg_5Si_8O_{22}(OH)_2$], actinolite asbestos [$Ca(MgFe)_3(SiO_2)_4H_2O$], rock wool, glass fibers, and slug wool. The mineral fibers particularly play a role of reinforcing molded articles obtained from the non-combustible molding material. Preferably, therefore, the mineral fibers have a length of 5 to 15 mm. Mineral fibers shorter than 5 mm do not serve for reinforcing purposes. If the mineral fibers are longer than 15 mm, they are entangled with each other, and it becomes difficult to disperse them uniformly in the hydraulic inorganic mixture.

The amount of the mineral fibers is 10 to 200 parts by weight per 100 parts by weight of the hydraulic inorganic mixture. Favorable results are obtained with 20 to 100 parts by weight, especially 50 to 80 parts by weight.

One of the substance used as a third component in the present invention is bitumen, which includes coal tar, petroleum tar, ceresine and petrolatum (vaseline).

The amount of bitumen is 0.5 to 5 parts by weight, preferably up to 2.0 parts by weight, per 100 parts by weight of the hydraulic inorganic mixture.

By the addition of the third component described above, there can be obtained a non-combustible molding material which gives non-combustible molded articles having high flexural strength and very low water imbibition. These improvements are considered due to the action of bitumen as a binder of the hydraulic inorganic mixture and the mineral fibers. It is assumed that the third component added comes into the interspaces in the hydraulic inorganic mixture and the mineral fibers, and by heat and pressure, firmly binds the hydraulic inorganic mixture and the mineral fibers. The effect of the thrid component as a binder also has to do with the molding pressure of the resulting non-combustible molding material, and the higher the molding pressure is, the more the flexural strength and the water imbibition are improved with lesser amounts of the third component. Where bitumen is used as the third component, not only the flexural strength and the water imbibition are improved, but also the impact strength is improved. It has, however, been found that according to the kind of bitumen, the extent of improvement of the flexural strength and the water imbibition differs.

It has also been found that a molding material comprising 100 parts by weight of the hydraulic inorganic mixture, 10 – 200 parts by weight of the mineral fibers, and at most 15 parts by weight, preferably 1 to 5 parts by weight, of crystalline aluminum oxide also gives non-combustible molded articles having outstandingly improved flexural strength. The improvement of the flexural strength is due to the formation of aluminum tobermolite resulting from the replacement of part of Si in tobermolite ($5CaO.6SiO_2.5H_2O$) by aluminum which tobermolite and aluminum tobermolite materials are formed by heating this non-combustible molding material at 150° – 210°C., preferably 170° – 190°C., at a vapor pressure of 5 to 20 atmospheres, preferably 7 to 10 atmospheres.

The crystalline aluminum oxide that can be used in the present invention includes α-alumina ($\alpha Al_2O_3$), γ-alumina ($\gamma-Al_2O_3$), α-alumina monohydrate ($\alpha-Al_2O_3.H_2O$), β-alumina monohydrate ($\beta-Al_2O_3.H_2O$), α-alumina trihydrate ($\alpha-Al_2O_3.3H_2O$), and β-alumina trihydrate ($\beta-Al_2O_3.3H_2O$).

If the amount of the crystalline aluminum oxide is more than 15 parts by weight per 100 parts by weight of the hydraulic inorganic mixture, the excess crystalline aluminum oxide forms the crystals of hydrogarnet ($3CaO.Al_2O_3.SiO_2.4H_2O$) together with the aluminum tobermolite formed in tobermolite, and the hydrogarnet causes a marked reduction in the flexural strength of the resulting molded articles.

The flexural strength of the molded article is maximum when about 2 parts by weight of the crystalline aluminum oxide is added per 100 parts by weight of the hydraulic inorganic mixture. If the amount of the crystalline aluminum oxide exceeds 2 parts by weight but not more than 15 parts by weight, hydrogarnet is formed together with aluminum tobermolite. But since the amount of hydrogarnet formed is small, the flexural strength of the molded article is still good. On the other hand, when the amount of the crystalline aluminum oxide is more than 15 parts by weight, the influence of hydrogarnet is great, and the flexural strength is reduced abruptly. When clay which contains great amounts of amorphous aluminum oxide together with crystalline aluminum oxide, or aluminum oxide which is a mixture of crystalline and non-crystalline forms is added, hydrogarnet is formed in great quantities together with the formation of aluminum tobermolite, and the flexural strength is not improved so much as compared with the case of adding the crystalline aluminum oxide. Hence, such substances cannot be used in the present invention. In view of this, it is necessary in the invention to use pure crystalline aluminum oxide or crystalline aluminum oxide containing only a small amount of amorphous aluminum oxide so as not to impede the improvment of the flexural strength by the formation of hydrogarnet.

Further the non-combustible molding composition of the present invention may include sulfur or metal sulfides as the case may be.

As sulfur, solid sulfur such as monoclinic sulfur, rhombic sulfur and amorphous sulfur are in use and as metal sulfides, potassium sulfide, tin sulfide, iron sulfide, copper sulfide, sodium sulfide, barium sulfide, cadmium sulfide, cobalt sulfide, lead sulfide and zinc sulfide are preferably used. These sulfurs and metal sulfides may be used in combination of one or more than two types.

Less than 10 parts of sulfur or metal sulfide is mixed and kneaded with 100 parts of hydraulic inorganic substance. When amounts of addition of sulfur or metal sulfides are 1 to 5 parts by weight, a product having high flexural strength, low heat shrinkage and low dimensional variations is obtained.

If the composition of the present invention including such sulfur or metal sulfides is made into a molded article by the following method, tobermolite and sulfur tobermolite resulting from the replacement of part of Si in tobermolite by sulfur are produced and the sulfur tobermolite contributes greatly to the improvements of flexural strength, heat shrinkage and dimensional variations of the article.

If the amounts of addition of sulfur and sulfides are more than 10 parts by weight per 100 parts by weight of hydraulic inorganic substance, unreacted sulfur or metal sulfide acts only fillers resulting in lowering remarkably the mechanical strength of the molded article. On the other hand, less than one part of sulfur or metal sulfides will not produce any effect through their addition.

As vanadium oxides to be included in the non-combusible molding composition of the present invention are listed vanadium pentoxide ($V_2O_5$), vanadium sesquioxide ($V_2O_3$), vanadium dioxide ($VO_2$), vanadium monoxide ($VO$), sodium metavanadate ($NaVO_3$) and ammonium metavanadate ($NH_4VO_3$). These vanadium oxides may be for use in mixing of one or more than two types. The amount to be added of vanadium oxides is preferably 1 to 10 parts by weight and when vanadium oxides are present in 3 to 8 parts by weight, is given an molded article having excellent heat shrinkage, whose dimensional variation is low at the time when water is absorbed.

If more than 10 parts by weight of vanadium oxides are to be added per 100 parts of hydraulic inorganic substance, unreacted vanadium oxides remain only fillers to lower remarkably the mechanical strength of the molded article. When less than one part of vanadium oxides is added, sufficient mechanical strength, hardness, dimensional stability and thermal stability expected from their addition cannot be attained for the product.

The non-combustible molding material of the present invention is prepared by uniformly mixing (a) 100 parts by weight of a hydraulic inorganic mixture consisting of an inorganic substance composed predominantly of silica and an inorganic substance composed predominantly a source of calcium oxide, (b) 10 to 200 parts by weight of mineral fibers, and (c) a substance selected from the group consisting of (1) 0.5 to 5 parts by weight of bitumen, (2) 1 to 15 parts by weight of crystalline aluminum oxide, (3) 1 to 10 parts by weight of sulfur, (4) 1 to 10 parts by weight of metal sulfide, and (5) 1 to 10 parts by weight of vanadium oxide with water. A reaction promotor such as sodium hydroxide, potassium hydroxide, lithium hydroxide, or alumina may be added.

Various conventional methods can be utilized to perform the mixing of the above ingredients. One preferred method comprises feeding a mixture of the components (a) and (b) into a cylinder, while kneading the mixture, feeding an aqueous dispersion of the component (c) into the cylinder, and continuing the kneading to distribute said dispersion uniformly in said mixture. Specifically, this method is performed by using an extruder whose partial cross-sectional view is shown in the accompanying drawing.

Referring to the drawing, mineral fibers are added to a powdery hydraulic inorganic mixture, and they are thoroughly mixed in a mixer. A desired amount of the resultant mixture is poured into a material feed inlet 2 of the extrusion-molding machine.

The mixture is then fed into a cylinder 7 and uniformly kneaded by the rotation of a screw 1 by a drive mechanism 5. During this time, the mixture is being transported towards an extrusion outlet opening 4 formed at the forward end of the cylinder 7. About midway between the extrusion outlet opening 4 and the inlet opening 2 is provided a fluid feed inlet 3 adapted to feed an aqueous dispersion of the bitumen the crystalline aluminum oxide, the sulfur, metal sulfide and/or vanadium oxide (component (c) above) into the cylinder 7. The dispersion is fed into the cylinder 7 from a reservoir tank (not shown) through a conduit (not shown) by the action of a pump. It is preferred that the amount of the dispersion should be 50 to 160 parts by weight per 100 parts by weight of the hydraulic inorganic mixture.

Thus, water or the dispersion fed from the fluid opening 3 is uniformly distributed in the composition consisting of the hydraulic inorganic mixture and the mineral fibers, and the composition is transported in the cylinder 7 while being continuously kneaded, and extruded from the extrusion outlet opening 4 before the completion of hardening of the hydraulic inorganic mixture.

According to this method, the mineral fibers are oriented in the extrusion direction, and therefore, a non-combustible molding material having very high flexural strength in the extrusion direction can be obtained. The surface of the resulting material is smooth.

By fitting a die of the desired configuration such as plate or cylinder to the forward end of the cylinder, a non-combustible molded article of the desired shape can be obtained continuously. Furthermore, the length of the molded article can be freely adjusted.

The production of molded articles from the molding material of the present invention is not limited to the molding method described above, but other methods can also be used. For example, 300 to 2000 parts by weight of water is added to 100 parts by weight of the non-combustible molding material and the mixture is put into a die and shaped by direct pressurization while performing dehydration. Alternatively, the mixture is put into a sheet-making machine or a filtration machine to form a suitable plate-like article, and as required, the plate-like article is put into a die frame of the desired shape to mold the plate-like article.

The molded article so obtained is dehydrated to a moisture content of 5 to 50 percent by weight under a pressure of at least 50 kg/cm². In ordinary molding operations, it is preferred to limit the molding pressure to 50 kg/cm² to 600 kg/cm², and the moisture content to 5 – 50 percent by weight.

By adjusting the moisture content of the plate-like article to 5 – 50 percent by weight, the content of non-amorphous calcium silicate increases, whereas the content of crystalline calcium silicate decreases. Thus, the amorphous calcium silicate acts as a binding material for the crystalline substance and the mineral fibers to remove water and elevate the molding pressure. Consequently, the crystal structure is most compacted, and there can be obtained a non-combustible molded article of high flexural strength.

If the water content of the molded article is less than 5 percent by weight, large amounts of unreacted $SiO_2$ and CaO remain and cause difficultly of forming calcium silicate. On the other hand, if the water content exceeds 50 percent, the content of the amorphous substance becomes small and the content of the crystalline substance increases, in which case a molded article of high flexural strength cannot be obtained.

It is preferred that during the moisture content adjustment, the molding pressure should be maintained at 50 kg/cm² to 600 kg/cm². When the molding operation is performed at a pressure smaller than 50 kg.cm², it is difficult to reduce the moisture content to less than 50 percent by weight, and it is difficult to compact the hydraulic inorganic mixture and the mineral fibers. If the molding pressure exceeds 600 kg/cm², there is a tendency that it is difficult to increase the moisure content above 5 percent by weight.

The molded article so dehydrated is then heated and cured. As required, the molded article is aged by heating at 60° –90°C. at atmospheric pressure for 5 to 10 hours, and then aged again in an autoclave by heating at 150 ° –210°C. and 5 to 20 atmospheres for 5 to 20 hours. Finally, the molded article is dried to form a non-combustible article having very high flexural strength. The article is cut into the desired sizes and shapes, and polished to provide final articles.

Where it is desired to produce a non-combustible molded article of light weight, an organic blowing agent is added to the non-combustible molding material together with water, and a foamed article of light weight is produced.

The organic blowing agents that can be used in the present invention decompose at a temperature of 150° to 200°C., and include, for example, dinitrosopentamethylene tetramine, 1,1'-azoidicarbonomide, benzenesulfonyl hydrazide, benzenesulfonyl hydrazide derivatives, 4,4'-hydroxybisbenzenesulfonly hydrazide, para-toluenesulfoazide, or toluenesulfonyl hydrazide. These organic blowing agents can be used either alone or in admixture with each other. The preferred amount of the organic blowing agent is 5 to 10 parts by weight, especially 7 to 9 parts by weight, based on the mixture of the hydraulic inorganic mixture and the mineral fibers. If the amount of the blowing agent is too small, the resulting molded article is not light in weight although its flexural strength increases. On the other hand, if the amount is too large, the resulting molded article is light in weight, but its flexural strength decreases drastically.

Liquid volatile blowing agents which decompose or volatilize at 150° –200°C. may also be used in the present invention.

Conventional additives such as inorganic pigments or fillers may be added to the non-combustible molding material of the invention.

The molded article of the invention obtained above has very high flexural strength, low water imbibition and hardly has fuming, flaming, and after-flaming properties. It can be formed into any desired shape such as plate-like or curved shapes, and is useful as wall, flooring and, ceiling materials, or other articles which require non-combustibility.

The invention will be described further by the following Examples in which all parts are by weight.

The various properties are determined by the following methods.

NON-COMBUSTIBILITY

A sample having a size of 22 × 22 cm is burned for 3 minutes with a city gas burner in which air is fed at a rate of 1.5 liters/min. Thereafter, it is additionally burned with an electric heater with nichrome wire having a capacity of 1.5 KW/hr. for 17 minutes. The fuming, flaming and after-flaming are observed, and the non-combustibility is determined from the overall consideration of the results of the observation.

FLEXURAL STRENGTH

A sample having a size of 50 × 120 × 30 − 80 mm is used. The measurement is made using an autoclave (18 − 2000) (product of Shimazu Seisakusho) in a constant humidity and temperature at 20 ± 1°C. and a humidity of 65 ± 5 percent.

IMPACT STRENGTH

Measured in accordance with JIS-A-5410.

WATER IMBIBITION (ABSORPTION RATE)

Measured in accordance with JIS-A-5905.

HEAT SHRINKAGE

On a sample, 30 × 200 × 60 ± 1 mm are drawn indicators 100 mm long and the length of the indicators is measured with a microscope. The specimen is allowed to stand for 30 min. in a gear oven at 100°C., taken out and measured with a microscope.

DIMENSIONAL VARIATION

A sample, 30 × 200 × 60 ± 1 mm is allowed to stand at a room temperature of 20 ± 1°C. and at a humidity of 65 ± 1 percent for 1 hour and its dimensions are measured. It is allowed to be a blank. It is dipped in water at 20°C. for 24 hr. and its dimensions are remeasured. Percentage of dimension variation is calculated by the following formula:

$$\text{Dimension variation (\%)} = \frac{\left(\begin{array}{c}\text{dimension of sample}\\ \text{after 24 hr dipping}\end{array}\right) - \left(\begin{array}{c}\text{dimension}\\ \text{of blank}\end{array}\right)}{(\text{dimension of blank})} \times 100$$

EXAMPLE 1

| | |
|---|---|
| Diatomaceous earth (SiO$_2$ 78.56 percent, Al$_2$O$_3$ 13.21 percent, Fe$_2$O$_3$ 4.11 percent, CaO 1.51 percent, MgO 1.25 percent, H$_2$O 2 − 3 percent, heat ignition loss 1.11 percent, particle size of less than 300 mesh on Tyler's sieve) | 57 parts |
| Slaked lime | 43 parts |
| Asbestos | 50 parts |
| Coal tar | 1, 2 and 5 parts |

800 Parts of water was added to 100 parts of an incombustible molding material of the above composition. The mixture was thoroughly kneaded in a kneader and put into a mold of a size of 910 × 1820 × 6 mm. The kneaded mixture was then molded under a pressure of 200 kg/cm$^2$, and then aged under atmospheric pressure at 80°C. The mixture was then aged in an autoclave for 10 hours at 180°C. under 7 atmospheres and hardened.

The resulting molded plates were thoroughly dried, and then flexural strength, impact strength, and moisture absorption rate were measured. As shown in Table 1 below, flexural strength and impact strength were excellent with low moisture absorption rate and excellent incombustibility.

Table 1

| Amount of coal tar (part) | Flexural strength (kg/cm$^2$) |
|---|---|
| 1 | 270 |
| 2 | 380 |
| 3 | 310 |

COMPARATIVE EXAMPLE 1

Using the same molding material as that of Example 1 except without coal tar and using the same molding material as that of Example 1 except with 10 parts of coal tar, molded plates were obtained in the same manner as in Example 1. Measurement of the molded plate which does not contain coal tar showed a flexural strength of 210 kg/cm$^2$, an impact strength of 180 kg/cm$^2$, and a moisture absorption rate of 52 percent, and measurement of the molded plate which contains 10 parts of coal tar showed a flexural strength of 290 kg/cm$^2$, an impact strength of 220 kg/cm$^2$ and a moisture absorption rate of 25 percent. The non-combustibility of the molded plate containing 10 parts of coal tar was poor.

COMPARATIVE EXAMPLE 2

| | |
|---|---|
| Portland cement | 100 parts |
| Asbestos | 50 parts |
| Coal tar | 1, 2 and 5 parts |

The molded articles were made from the above molding composition in the same manner as in Example 1. Flexural strengths obtained are as shown in Table 2 below.

Table 2

| Amount of coal tar added (part) | Flexural strength of molded articles (kg/cm$^2$) |
|---|---|
| 1 | 250 |
| 2 | 300 |
| 3 | 300 |

EXAMPLES 2 – 4

The same procedure as described in Example 1 was repeated except that a non-combustible molding material shown in Table 3 was used instead of the material used in Example 1. The results are shown in Table 3 also.

Table 3

| Examples | Constituents of the non-combustible molding material (parts) | | | | Properties of the molded articles | | |
|---|---|---|---|---|---|---|---|
| | Quartz rock | Cement | Asbestos | Coal tar | Flexural strength (kg/cm$^2$) | Rate of water absorption (%) | Non-combustibility |
| 2 | 50 | 50 | 30 | 1 | 400 | 25 | Excellent |
| 3 | 50 | 50 | 30 | 2 | 370 | 23 | '' |
| 4 | 50 | 50 | 30 | 5 | 290 | 18 | '' |

In these Examples, 1000 parts of water was added per 100 parts of the non-combustible molding article.

EXAMPLES 5 – 9

| | |
|---|---|
| Quartz rock (SiO$_2$ 99.4 percent, Al$_2$O$_3$ 0.44 percent, Fe$_2$O$_3$ 0.04 percent; heat ignition loss 0.22 percent) | 50 parts |
| Slaked lime | 50 parts |
| Asbestos | 50 parts |
| Crystalline aluminum oxide | 1, 2, 5, 10 and 15 parts |

Water (800 parts) was added to 100 parts of a non-combustible molding material of the above formulation. The mixture was fully kneaded in a kneader and put into a mold having a size of 910 × 1820 × 6 mm. The mixture was molded at a pressure of 200 kg/cm$^2$ to reduce its moisture content to 40 percent. The molded article was aged for 10 hours by heating at 80°C. at atmospheric pressure and then for 10 hours in an autoclave at 180°C. and 7 atmospheres.

The resultant mixture was thoroughly dried and then observed by X-ray diffraction analysis and microscopic examination. It was confirmed that tobermolite and aluminum tobermolite were formed in the molded article. The flexural strength of the molded product was measured and the results are given in Table 4 below. The molded articles were inferior in fuming, flaming and after-flaming properties and excellent in non-combustibility.

Table 4

| Examples | Amount of crystalline aluminum oxide (parts) | Flexural strength of molded articles (kg/cm$^2$) | Non-combustibility |
|---|---|---|---|
| 5 | 1 | 370 | Excellent |
| 6 | 2 | 500 | '' |
| 7 | 5 | 450 | '' |
| 8 | 10 | 390 | '' |
| 9 | 15 | 300 | '' |

EXAMPLE 10

| | |
|---|---|
| Diatomaceous earth (SiO$_2$ 78.56 percent, Al$_2$O$_3$ 13.21 percent, Fe$_2$O$_3$ 4.11 percent, CaO 1.51 percent, MgO 1.25 percent, H$_2$O 2 – 3 percent; heat ignition loss 1.11 percent; particle size smaller than 300 mesh on Tyler's sieve) | 50 parts |
| Slaked lime | 50 parts |
| Asbestos | 50 parts |
| Crystalline aluminum oxide | 5 parts |

Water (800 parts) was added to 100 parts of a non-combustible molding material of the above formulation. The resultant mixture was kneaded in a kneader, and put into a mold having a size of 910 × 1820 × 6 mm. The kneaded mixture was molded at a pressure of 200 kg/cm$^2$ to reduce its moisture content to 40 percent. The molded article was aged for 10 hours by heating at 80°C. at atmospheric pressure, and then aged in an autoclave for 10 hours by heating at 180°C. and 7 atmospheres. The resulting molded article was thoroughly dried and observed by X-ray diffraction analysis and electron-microscopic examination. It was confirmed that tobermolite and aluminum tobermolite were formed.

The molded article had a flexural strength of 380 kg/cm$^2$ and had excellent non-combustibility being substantially free from fuming, flaming and afterflaming properties.

For comparison, the above procedure was repeated using a composition consisting of 50 parts of quartz rock (SiO$_2$ 99.4 percent, Al$_2$O$_3$ 9.44 percent, Fe$_2$O$_3$ 0.04 percent; heat ignition loss 0.22 percent), 50 parts of slaked lime, 0 or 16 parts of crystalline aluminum oxide, and 50 parts of asbestos. It was confirmed by X-ray diffraction analysis and electron-microscopic examination that in the case of adding no crystalline aluminum oxide, aluminum tobermolite was formed; and that when it was added in an amount of 16 parts, a large amount of hydrogarnet was formed in addition to aluminum tobermolite.

The resulting molded article had good non-combustibility, but had a flexural strength of 250 kg/cm$^2$ (in the case of adding no crystalline aluminum oxide) and 240 kg/cm$^2$ (in the case of adding the aluminum oxide in an amount of 16 parts).

EXAMPLE 11

| | |
|---|---|
| Diatomaceous earth (SiO$_2$ 99.4 percent, Al$_2$O$_3$ 0.44 percent, Fe$_2$O$_3$ 0.04 percent, heat ignition loss 1.11 percent) | 50 parts |
| Slaked lime | 50 parts |
| Crystalline aluminum oxide | 1, 2, 10 and 15 parts |
| Asbestos | 50 parts |

800 Parts of water was added to 100 parts of the above composition. The mixture was fully kneaded in a kneader and then put into a mold of a size 910 × 1820 × 6 mm, and molded under a pressure of 200 kg/cm$^2$, followed by aging at 80°C. for 10 hours. The mixture was then aged in an autoclave heated at 180°C. under 7 atmospheres for 10 hours.

The so obtained molded articles after being fully dried were measured by means of X-ray diffraction and an electron microscope. And the formation of tobermolite and aluminum tobermolite were observed. Measurement of the molded articles for flexural strength showed the results as listed in Table 5 below. The molded articles hardly possessed fuming, flaming and after-flame properties, and were excellent in non-combustibility.

Table 5

| Amount of crystalline aluminum oxide added (part) | Flexural strength of molded articles (kg/cm$^2$) |
|---|---|
| 1 | 370 |
| 2 | 500 |
| 10 | 390 |
| 15 | 300 |

COMPARATIVE EXAMPLE 3

Using the same molding material as that of Example 11 except without crystalline aluminum oxide and using the same molding material as that of Example 11 except with 20 parts of crystalline aluminum oxide, molded articles were obtained in the same manner as in Example 11. Measurement of the molded article which does not contain crystalline aluminum oxide showed a flexural strength of 220 kg/cm$^2$, and the measurement of the molded material which contains 20 parts of crystalline aluminum oxide showed a flexural strength of 180 kg/cm$^2$.

Measurement of the molded articles by means of X-ray diffraction and an electron microscope showed that the molded article containing no crystalline aluminum oxide does not cause the formation of aluminum tobermolite and the molded article which contains 20 parts of crystalline aluminum oxide causes the formation of aluminum tobermolite as well as a large amount of hydrogarnet.

COMPARATIVE EXAMPLE 4

| | |
|---|---|
| Portland cement | 100 parts |
| Crystalline aluminum oxide | 1, 2, 10 and 15 parts |
| Asbestos | 50 parts |

Molded articles were obtained by using the above composition in the same manner as in Example 11. The flexural strengths of the molded articles were as listed in Table 6 below.

Table 6

| Amount of crystalline aluminum oxide (part) | Flexural strength of of molded articles (kg/cm$^2$) |
|---|---|
| 1 | 300 |
| 2 | 290 |

Table 6-continued

| Amount of crystalline aluminum oxide (part) | Flexural strength of of molded articles (kg/cm$^2$) |
|---|---|
| 10 | 280 |
| 15 | 280 |

EXAMPLES 12 – 15

| | |
|---|---|
| Diatomaceous earth (SiO$_2$ 99.4 percent, Al$_2$O$_3$ 0.44 percent, Fe$_2$O$_3$ 0.04 percent, heat ignition loss 0.22 percent) | 50 parts |
| Slaked lime | 50 parts |
| Sulfur | 1, 3, 5 and 10 parts |
| Asbestos | 50 parts |

800 Parts of water was added to 100 parts of a non-combustible molding, material comprising the above composition. The mixture was thoroughly kneaded with a kneader and put into a mold having a size of 910 × 1820 × 6 mm to mold it under a pressure of 100 kg/cm$^2$. Then it was held at 80°C. for 10 hours at normal pressure for a first aging, at 180°C. in an autoclave for 10 hours at 10 atmospheres for a second aging and hardened.

The resultant molded article was thoroughly dried and it was confirmed by X-ray diffraction and differential thermal analysis that tobermolite and sulfur tobermolite resulting from the replacement of part of Si in tobermolite by sulfur were formed.

Flexural strength, heat shrinkage and dimension variation when the molded article was moistened were measured in Table 7.

Table 7

| Examples | Amount of sulfur to be added (part) | Flexural strength (kg/cm$^2$) | Heat shrinkage (%) | | | Dimension variation when article is moistened (%) | Non-combustibility |
|---|---|---|---|---|---|---|---|
| | | | 100°C | 200°C | 300°C | | |
| 12 | 1 | 295 | −0.02 | −0.15 | −0.32 | 0.00 | Excellent |
| 13 | 3 | 285 | −0.02 | −0.08 | −0.35 | +0.08 | " |
| 14 | 5 | 280 | −0.02 | −0.16 | −0.31 | +0.08 | " |
| 15 | 10 | — | — | −0.17 | −0.18 | −0.05 | " |

COMPARATIVE EXAMPLES 5 and 6

Withe the use of the molding materials of Example 12 except with no sulfur and 15 parts of sulfur, respectively, molded articles were prepared by molding and aging them in the same conditions as in Example 12. The properties of the molded articles having an excellent non-combustibility are given in Table 8.

Table 8

| Comparative Examples | Amount of sulfur to be added (part) | Flexural strength (kg/cm$^2$) | Heat shrinkage (%) | | | Dimension variation when article is moistened (%) | Non-combustibility |
|---|---|---|---|---|---|---|---|
| | | | 100°C | 200°C | 300°C | | |
| 5 | 0 | 254 | −0.04 | −0.20 | −0.50 | +0.10 | Excellent |
| 6 | 15 | 150 | −0.05 | — | −0.40 | +0.10 | " |

EXAMPLES 16 – 19

Diatomaceous earth (SiO$_2$ 78.56 percent, Al$_2$O$_3$ 13.21 percent, Fe$_2$O$_3$ 4.11 percent, CaO 1.51 percent, MgO 1.25 percent, heat ignition loss 1.11 percent, H$_2$O 2 to 3 percent, particle -continued

| | |
|---|---|
| size of less than 300 mesh on Tyler's sieve) | 57 parts |
| Slaked lime | 43 parts |
| Asbestos | 50 parts |
| Calcium sulfide | 1, 3, 5 and 10 parts |

800 Parts of water was added to 100 parts of a non-combustible molding material comprising the aforesaid composition. The mixture was thoroughly kneaded with a kneader and put into a mold having a size of 910 × 1820 × 6 mm to mold it at 100 kg/cm². It was aged for 10 hours at 80°C. at normal pressure for a first aging, thereafter for 10 hours at 180°C. at 7 atmospheres in an autoclave for a second aging and hardened.

The resulting molded plate was thoroughly dried and properties of the plate having an excellent non-combustibility are as given in Table 9.

Table 9

| Examples | Amount of calcium sulfide to be added (part) | Flexural strength (kg/cm²) | Heat shrinkage (%) 100°C | 200°C | 300°C | Dimension variation when plate is moistened (%) | Non-combustibility |
|---|---|---|---|---|---|---|---|
| 16 | 1 | 348 | −0.05 | −0.14 | −0.31 | +0.05 | Excellent |
| 17 | 3 | 323 | −0.04 | −0.14 | −0.30 | +0.03 | " |
| 18 | 5 | 320 | −0.04 | −0.15 | −0.32 | −0.01 | " |
| 19 | 10 | 298 | −0.04 | — | −0.41 | +0.05 | " |

COMPARATIVE EXAMPLES 7 and 8

With the use of the molding materials of Example 16 except with no calcium sulfide and with 15 parts of calcium sulfide, respectively, molded articles were prepared by molding and aging them in the same conditions as in Example 16.

The properties of the molded articles are as shown in Table 10.

Table 10

| Comparative Examples | Amount of calcium sulfide to be added (part) | Flexural strength (kg/cm²) | Heat shrinkage (%) 100°C | 200°C | 300°C | Dimension variation when article is moistened (%) | Non-combustibility |
|---|---|---|---|---|---|---|---|
| 7 | 0 | 254 | −0.10 | −0.18 | −0.50 | +0.11 | Excellent |
| 8 | 15 | 268 | −0.10 | −0.18 | −0.50 | +0.06 | " |

EXAMPLES 20 – 23

Diatomaceous earth (SiO₂ 78.56 percent, Al₂O₃ 13.21 percent, Fe₂O₃ 4.11 percent, CaO 1.51 percent, MgO 1.25 percent, heat ignition loss 1.11 percent, H₂O 2 to 3 percent)

| | |
|---|---|
| | 57 parts |
| Slaked lime | 43 parts |
| Zinc sulfide | 1, 3, 5 and 10 parts |
| Asbestos | 50 parts |

800 Parts of water was added to 100 parts of a non-combustible molding material comprising the above composition. The mixture was kneaded and put into a mold 910 × 1820 × 6 mm to mold it under 100 kg/cm². Then it was held at 80°C. for 10 hours at normal pressure for a first aging and at 180°C. in an autoclave for 10 hours at 7 atmospheres for a second aging and hardened.

The resultant molded article was thoroughly dried and it was confirmed by X-ray diffraction and differential thermal analysis that tobermolite and sulfur tobermolite resulting from the replacement of part of Si in tobermolite by sulfur were formed.

The properties are as given in Table 11.

Table 11

| Examples | Amount of zinc sulfide to be added (part) | Flexural strength (kg/cm²) | Heat shrinkage (%) 100°C | 200°C | 300°C | Dimension variation when article is moistened (%) | Non-combustibility |
|---|---|---|---|---|---|---|---|
| 20 | 1 | 343 | −0.04 | −0.12 | −0.30 | +0.02 | Excellent |
| 21 | 3 | 355 | −0.02 | −0.14 | −0.29 | +0.04 | " |
| 22 | 5 | 330 | −0.04 | −0.14 | −0.31 | +0.06 | " |
| 23 | 10 | 302 | −0.04 | −0.14 | −0.29 | +0.06 | " |

COMPARATIVE EXAMPLES 9 and 10

With the use of the molding materials of Example 20 except with no zinc sulfide and with 15 parts of zinc sulfide, respectively, molded articles were prepared by molding and aging them in the same conditions as in Example 20.

The properties of the molded articles are as shown in Table 12.

Table 12

| Comparative Examples | Amount of zinc sulfide to be added (part) | Flexural strength (kg/cm$^2$) | Heat shrinkage (%) 100°C | Heat shrinkage (%) 200°C | Heat shrinkage (%) 300°C | Dimension variation when article is moistened (%) | Non-combustibility |
|---|---|---|---|---|---|---|---|
| 9 | 0 | 254 | −0.10 | −0.18 | −0.50 | +0.11 | Excellent |
| 10 | 15 | 268 | −0.12 | −0.17 | — | +0.10 | " |

EXAMPLES 24 – 27

Diatomaceous earth (SiO$_2$ 78.56 percent, Al$_2$O$_3$ 13.21 percent, Fe$_2$O$_3$ 4.11 percent, CaO 1.51 percent, MgO 1.25 percent, heat ignition loss 0.22 percent, H$_2$O 2 to 3 percent)

|   |   |
|---|---|
| | 57 parts |
| Slaked lime | 43 parts |
| Iron sulfide | 1, 3, 5 and 10 parts |
| Asbestos | 50 parts |

800 parts of water was added to 100 parts of a non-combustible molding material comprising the aforesaid composition. The mixture was thoroughly kneaded with a kneader and put into a mold having a size of 910 × 1820 × 6 mm to mold it under a pressure of 100 kg/cm$^2$. Then it was held at 80°C. for 10 hours at normal pressure for a first aging, thereafter at 180°C. in an autoclave for 10 hours at 7 atmospheres for a second aging and hardened.

The resultant molded article was thoroughly dired and it was confirmed by X-ray diffraction and differential thermal analysis that tobermolite and sulfur tobermolite resulting from the replacement of Si in tobermolite with sulfur were formed.

The properties of the molded article are as given in Table 13.

Table 13

| Examples | Amount of iron sulfide to be added (part) | Flexural strength (kg/cm$^2$) | Heat shrinkage (%) 100°C | Heat shrinkage (%) 200°C | Heat shrinkage (%) 300°C | Dimension variation when article is moistened (%) | Non-combustibility |
|---|---|---|---|---|---|---|---|
| 24 | 1 | 358 | −0.04 | −0.16 | −0.32 | +0.05 | Excellent |
| 25 | 3 | 373 | −0.03 | −0.12 | −0.24 | +0.03 | " |
| 26 | 5 | 364 | −0.03 | −0.15 | −0.30 | +0.05 | " |
| 27 | 10 | 330 | −0.04 | −0.16 | −0.31 | +0.09 | " |

COMPARATIVE EXAMPLES 11 and 12

With the use of the molding materials of Example 24 except with no iron sulfide and with 15 parts of iron sulfide, respectively, molded articles were prepared by molding and aging them in the same conditions as in Example 24.

The properties of the molded articles are as given in Table 14.

Table 14

| Comparative Examples | Amount of iron sulfide to be added (part) | Flexural strength (kg/cm$^2$) | Heat shrinkage (%) 100°C | Heat shrinkage (%) 200°C | Heat shrinkage (%) 300°C | Dimension variation when article is moistened (%) | Non-combustibility |
|---|---|---|---|---|---|---|---|
| 11 | 0 | 254 | −0.10 | −0.18 | −0.50 | +0.10 | Excellent |
| 12 | 15 | 268 | −0.05 | −0.18 | −0.35 | +0.11 | " |

EXAMPLES 28 – 31

Diatomaceous earth (SiO$_2$ 99.4 percent, Al$_2$O$_3$ 0.44 percent, Fe$_2$O$_3$ 0.04 percent, heat ignition loss 0.22 percent)

|   |   |
|---|---|
| | 50 parts |
| Slaked lime | 50 parts |
| Vanadium pentoxide | 1, 3, 5 and 10 parts |
| Asbestos | 50 parts |

800 Parts of water was added to 100 parts of the aforesaid composition and thoroughly kneaded with a kneader. The mixture was placed in a mold, 910 × 1820 × 6 mm and molded at a pressure of 100 kg/cm$^2$. It was held at normal pressure and 80°C. for 10 hours for a first aging, thereafter at 10 atmospheres at 180°C. for 10 hours for a second aging and hardened. The resultant molded article was thoroughly dried and analyzed by X-ray diffraction, differential heat analysis and electron-ray diffraction to confirm that tobermolite and vanadium tobermolite resulting from the replacement of part of Si in tobermolite with vanadium were formed.

The properties of the articles are as given in Table 15.

Table 15

| Examples | Amount of vanadium pentoxide to be added (part) | Heat shrinkage (%) 100°C | Heat shrinkage (%) 200°C | Heat shrinkage (%) 300°C | Dimension variation when article is moistened (%) | Non-combustibility |
|---|---|---|---|---|---|---|
| 28 | 1 | −0.04 | −0.18 | −0.31 | — | Excellent |
| 29 | 3 | ±0 | −0.18 | −0.27 | +0.02 | " |

Table 15-continued

| Examples | Amount of vanadium pentoxide to be added (part) | Heat shrinkage (%) 100°C | 200°C | 300°C | Dimension variation when article is moistened (%) | Non-combustibility |
| --- | --- | --- | --- | --- | --- | --- |
| 30 | 5 | −0.04 | −0.17 | −0.28 | +0.03 | '' |
| 31 | 10 | −0.04 | −0.14 | −0.18 | +0.02 | '' |

EXAMPLES 32–35

Diatomaceous earth ($SiO_2$ 99.4 percent, $Al_2O_3$ 0.44 percent, $Fe_2O_3$ 0.04 percent, heat ignition loss 0.02 percent)
                      50 parts
Slaked lime            50 parts
Vanadium trioxide    1, 3, 5 and 10 parts
(Manufactured by Han-i Chemical Co. Ltd.)
Asbestos             50 parts 800 Parts of water was added to 100 parts of the aforesaid composition and kneaded thoroughly with a kneader. The mixture was placed in a mold 910 × 1820 × 6 mm and molded at a pressure of 100 kg/cm². It was allowed to stand at 80°C. and normal pressure for 10 hours for a first aging, thereafter at 180°C. and 10 atmospheres for 10 hours for a second aging and hardened. The resultant molded article was thoroughly dried and it was confirmed from X-ray diffraction, differential thermal analysis and electron-ray diffraction that tobermolite and vanadium tobermolite resulting from the replacement of part of Si in tobermolite by vanadium were formed.

The properties of the molded article are as given in Table 16. It had no fuming, flaming and after-flaming properties and a good non-combustibility was confirmed.

Table 16

| Examples | Amount of vanadium dioxide to be added (part) | Heat shrinkage (%) 100°C | 200°C | 300°C | Dimension variation when article is moistened (%) | Non-combustibility |
| --- | --- | --- | --- | --- | --- | --- |
| 32 | 1 | −0.04 | −0.17 | −0.35 | +0.06 | Excellent |
| 33 | 3 | −0.04 | −0.18 | −0.36 | +0.05 | '' |
| 34 | 5 | −0.04 | −0.17 | −0.31 | +0.04 | '' |
| 35 | 10 | −0.02 | −0.17 | −0.34 | +0.07 | '' |

EXAMPLES 36 – 39

Diatomaceous earth ($SiO_2$ 99.4 percent, $Al_2O_3$ 0.44 percent, $Fe_2O_3$ 0.04 percent, heat ignition loss 0.02 percent)
                      50 parts
Slaked lime            50 parts
Vanadium dioxide    1, 3, 5 and 10 parts
Asbestos            50 parts 800 Parts of water was added to 100 parts of the aforesaid composition and kneaded thoroughly with a kneader. The mixture was placed in a mold 910 × 1820 × 6 mm and molded under 100 kg/cm². It was allowed to stand at 80°C. and normal pressure for 10 hours for a first aging, thereafter at 180°C. at 10 atmospheres for 10 hours in an autoclave for a second aging and hardened. After thorough drying, the resultant molded article was subjected to X-ray diffraction, differential thermal analysis and electron-ray diffraction and it was confirmed that tobermolite and vanadium tobermolite resulting from the replacement of part of Si in tobermolite with vanadium were formed. The properties of the molded article are as given in Table 17.

Table 17

| Examples | Amount of vanadium dioxide to be added (part) | Heat shrinkage (%) 100°C | 200°C | 300°C | Dimension variation when article is moistened (%) | Non-combustibility |
| --- | --- | --- | --- | --- | --- | --- |
| 36 | 1 | — | −0.14 | −0.31 | +0.05 | Excellent |
| 37 | 3 | −0.04 | −0.14 | −0.31 | +0.02 | '' |
| 38 | 5 | −0.04 | −0.16 | −0.34 | +0.01 | '' |
| 39 | 10 | −0.04 | −0.19 | −0.40 | +0.05 | '' |

EXAMPLES 40 – 43

Diatomaceous earth ($SiO_2$ 99.4 percent, $Al_2O_3$ 0.44 percent, $Fe_2O_3$ 0.04 percent, heat ignition loss 0.02 percent)
                      50 parts
Slaked lime            50 parts
Sodium vanadate    1, 3, 5 and 10 parts
Asbestos            50 parts 800 Parts of water was added to 100 parts of the aforesaid composition and thoroughly kneaded with a kneader. The mixture was placed in a mold 910 × 1820 × 6 mm and molded at 100 kg/cm². It was allowed to stand at 80°C. and normal pressure for 10 hours for a first aging, thereafter at 180°C. and 10 atmospheres for 10 hours for a second aging and hardened. The resultant molded article was thoroughly dried and it was confirmed from X-ray diffraction, differential thermal analysis and electron-ray diffraction that tobermolite and vanadium tobermolite resulting from the replacement of part of Si in tobermolite with vanadium were formed.

The properties of the molded article are as given in Table 18.

Table 18

| Examples | Amount of sodium vanadate to be added (part) | Heat shrinkage (%) 100°C | 200°C | 300°C | Dimension variation when article is moistened (%) | Non-combustibility |
|---|---|---|---|---|---|---|
| 40 | 1 | −0.04 | −0.18 | −0.30 | +0.09 | Excellent |
| 41 | 3 | −0.04 | −0.14 | −0.32 | +0.05 | " |
| 42 | 5 | −0.05 | −0.17 | −0.33 | +0.05 | " |
| 43 | 10 | −0.05 | −0.19 | −0.37 | — | " |

EXAMPLES 44 – 47

Diatomaceous earth ($SiO_2$ 99.4 percent, $Al_2O_3$ 0.44 percent, $Fe_2O_3$ 0.04 percent, heat ignition loss 0.02 percent)  50 parts
Slaked lime  50 parts
Ammonium vanadate  1, 3, 5 and 10 parts
Asbestos  50 parts 800 Parts of water was added to 100 parts of the aforesaid composition and thoroughly kneaded with a kneader. The mixture was placed in a mold 910 × 1820 × 6 mm and molded at 100 kg/cm². It was allowed to stand at 80°C. and normal pressure for 10 hours for a first aging, thereafter at 180°C. and 10 atmospheres for 10 hours for a second aging and hardened. The resultant molded article was thoroughly dried and it was confirmed by X-ray diffraction, differential thermal analysis and electron-ray diffraction that tobermolite and vanadium tobermolite resulting from the replacement of part of Si in tobermolite by vanadium were formed.

The properties of the molded article are as given in Table 19.

Table 19

| Examples | Amount of ammonium vanadate to be added (part) | Heat shrinkage (%) 100°C | 200°C | 300°C | Dimension variation when article is moistened (%) | Non-combustibility |
|---|---|---|---|---|---|---|
| 44 | 1 | −0.05 | −0.19 | −0.31 | ±0 | Excellent |
| 45 | 3 | −0.04 | −0.18 | −0.31 | +0.05 | " |
| 46 | 5 | −0.04 | −0.16 | −0.32 | +0.05 | " |
| 47 | 10 | −0.06 | −0.19 | −0.29 | +0.05 | " |

We claim:

1. A non-combustible molding composition which is capable of hardening after being dehydrated to a moisture content of 5 to 50 percent by weight comprising:
   a. 100 parts by weight of a hydraulic inorganic mixture consisting of an inorganic substance composed predominantly of silica selected from the group consisting of quartz rock, silica sand, aplite, pottery stone, silicate terra alba, diaspore, diatomaceous earth, fly ash, perlite, obsidian perlite, pumice microballoon, foamed shale pumice, foamed clay and vermiculite; and an inorganic substance composed predominantly of a source of calcium oxide selected from the group consisting of slaked lime, quick lime and calcium carbonate, the molar ratio of the inorganic substance composed predominantly of a source of calcium oxide to the inorganic substance composed predominantly of silica being from 0.1 to 1.2;
   b. 10 to 200 parts by weight of mineral fibers selected from chrysotile asbestos, amosite asbestos, crocidolite asbestos, amphibole asbestos, tremolite asbestos, actinolite asbestos, rock wool, glass fiber and slag wool; and
   c. 1 to 15 parts by weight of crystalline aluminum oxide.

2. A water-hardened, non-combustible molded article comprising:
   a. 100 parts by weight of a hydraulic inorganic mixture consisting of an inorganic substance composed predominantly of silica selected from the group consisting of quartz rock, silica sand, aplite, pottery stone, silicate terra alba, diaspore, diatomaceous earth, fly ash, perlite, osidian perlite, pumice microballoon, foamed shale pumice, foamed clay and vermiculite; and an inorganic substance composed predominantly of a source of calcium oxide selected from the group consisting of slaked lime, quick lime and calcium carbonate, the molar ratio of the inorganic substance composed predominantly of a source of calcium oxide to the inorganic substance composed predominantly of silica being from 0.5 to 1.2;
   b. 10 to 200 parts by weight of mineral fibers selected from chrysotile asbestos, amosite asbestos, crocidolite asbestos, amphibole asbestos, tremolite asbestos, actinolite asbestos, rock wool, glass fiber and slag wool; and
   c. 1 to 15 parts by weight of crystalline aluminum oxide.

3. A process for producing a non-combustible molded article, which comprises:
   i. mixing uniformly a molding composition consisting essentially of
   a. 100 parts by weight of a hydraulic inorganic mixture consisting of an inorganic substance composed predominantly of silica selected from the group consisting of quartz rock, silica sand, aplite, pottery stone, silicate terra alba, diaspore, diatomaceous earth, fly ash, perlite, obsidian perlite, pumice microballoon, foamed shale pumice, foamed clay and vermiculite; and an inorganic substance composed predominantly of a source of calcium oxide selected from the group consisting of slaked lime, quick lime and calcium carbonate, the molar ratio of the inorganic substance composed predominantly of a source of calcium oxide to the inorganic substance composed predominantly of silica being from 0.5 to 1.2;

b. 10 to 200 parts by weight of mineral fibers selected from chrysotile asbestos, amosite asbestos, crocidolite asbestos, amphibole asbestos, tremolite asbestos, actinolite asbestos, rock wook, glass fiber and slag wool;

c. 1 to 15 parts by weight of crystalline aluminum oxide, d. 300 to 2000 parts by weight per 100 parts by weight of the total amount of components (a), (b) and (c), of water.

ii. molding the mixture so obtained, iii. dehydrating the molded article at a pressure of at least 50 kg/cm$^2$ to a moisture content of 5 to 50 percent by weight, and iv. heating the molded article to harden it at a temperature of 150°–210°C and at a vapor pressure of 5 to 20 atmospheres.

4. The process of claim 3, wherein a reaction promotor is added to said molding composition.

5. The process of claim 4, wherein said reaction promotor is selected from the group consisting of sodium hydroxide, potassium hydroxide, lithium hydroxide, and alumina.

6. The process of claim 3, wherein said hardening is performed by first heating the molded article at 60° – 90°C. at atmospheric pressure for 5 to 10 hours, and then heating it in an autoclave for 5 to 20 hours at 150° – 210°C. and 5 to 20 atmospheres.

7. The process of claim 3, wherein an organic blowing agent is added to said molding composition.

8. The process of claim 7, wherein said organic blowing agent is an organic heat-decomposible blowing agent which is decomposed at 150° to 250°C.

9. The process of claim 8, wherein said blowing agent is selected from the group consisting of dinitrosopentamethylene tetramine, 1,1'-azodicarbonamide, benzenesulfonyl hydrazide, benzenesulfonyl hydrazide derivatives, 4,4'-hydroxybisbenzene-sulfonyl hydrazide, para-toluenesulfoazide, and toluene-sulfonyl hydrazide.

10. A composition according to claim 1 wherein
a. is a hydraulic mixture of quartz rock and slaked lime, and (b) is chysotile asbestos.

11. A composition according to claim 2 wherein
a. is a hydraulic mixture of quartz rock and slaked lime, and (b) is chysotile asbestos.

12. A process according to claim 3 wherein
a. is a hydraulic mixture of quartz rock and slaked lime, and (b) is chysotile asbestos.

13. A process according to claim 5 wherein the reaction promoter is sodium hydroxide.

* * * * *